R. O. HENDRICKSON.
STEERING MECHANISM FOR TRACTOR ENGINES.
APPLICATION FILED SEPT. 20, 1913.
1,235,687.
Patented Aug. 7, 1917.
3 SHEETS—SHEET 1.
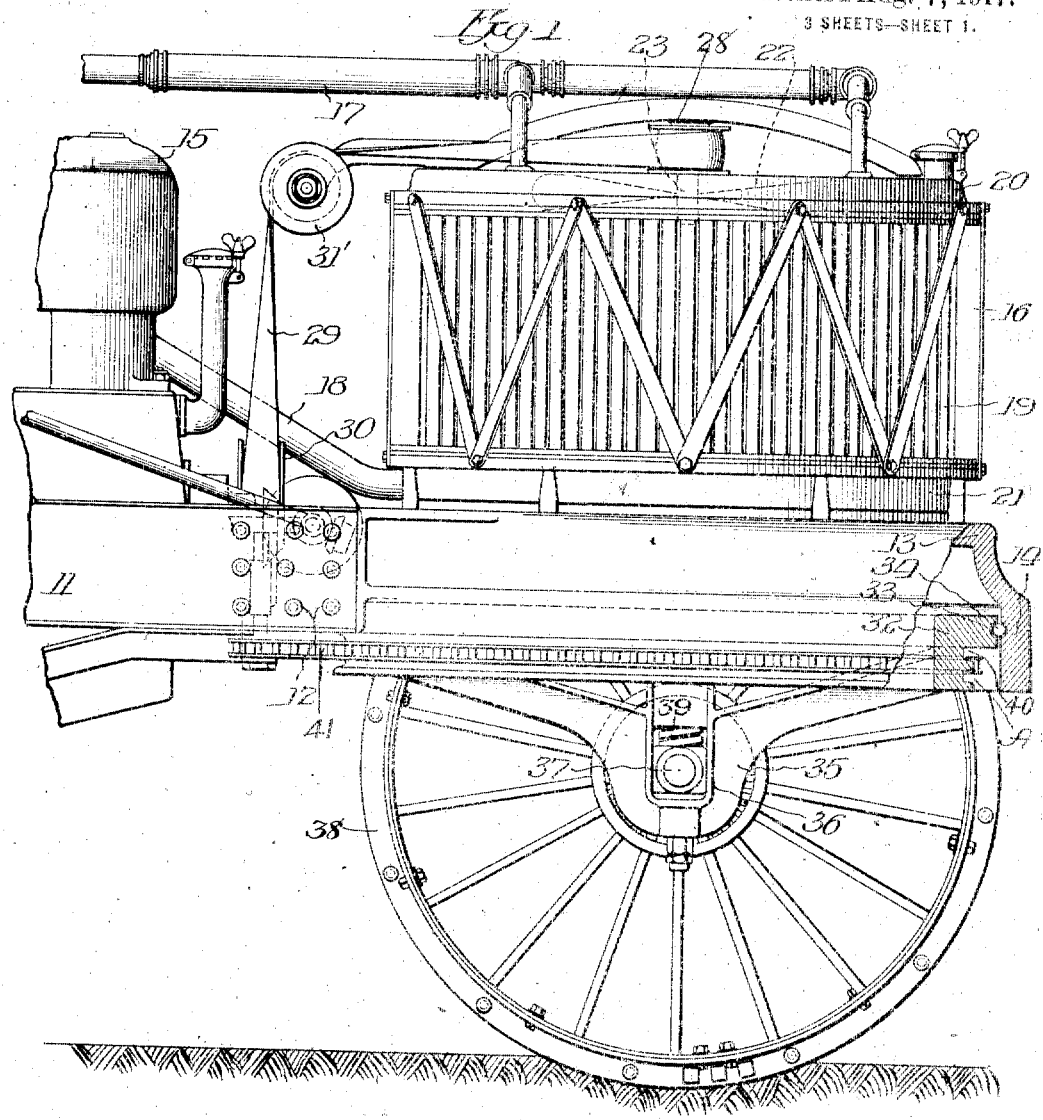
Witnesses:
Fed. C. Davison
Chas. Koursh.
Inventor:
Robert O. Hendrickson
By [signature]
Attys

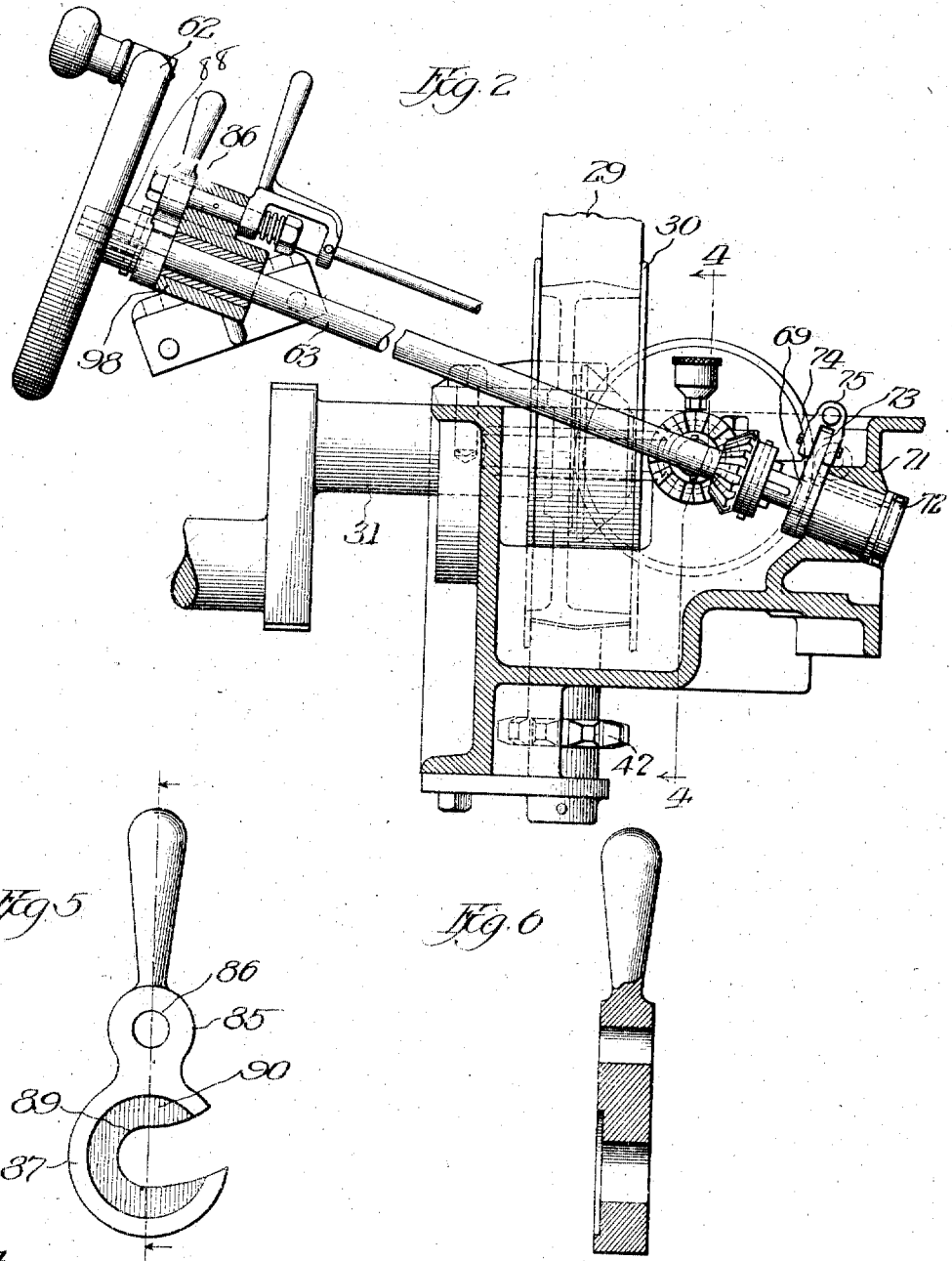

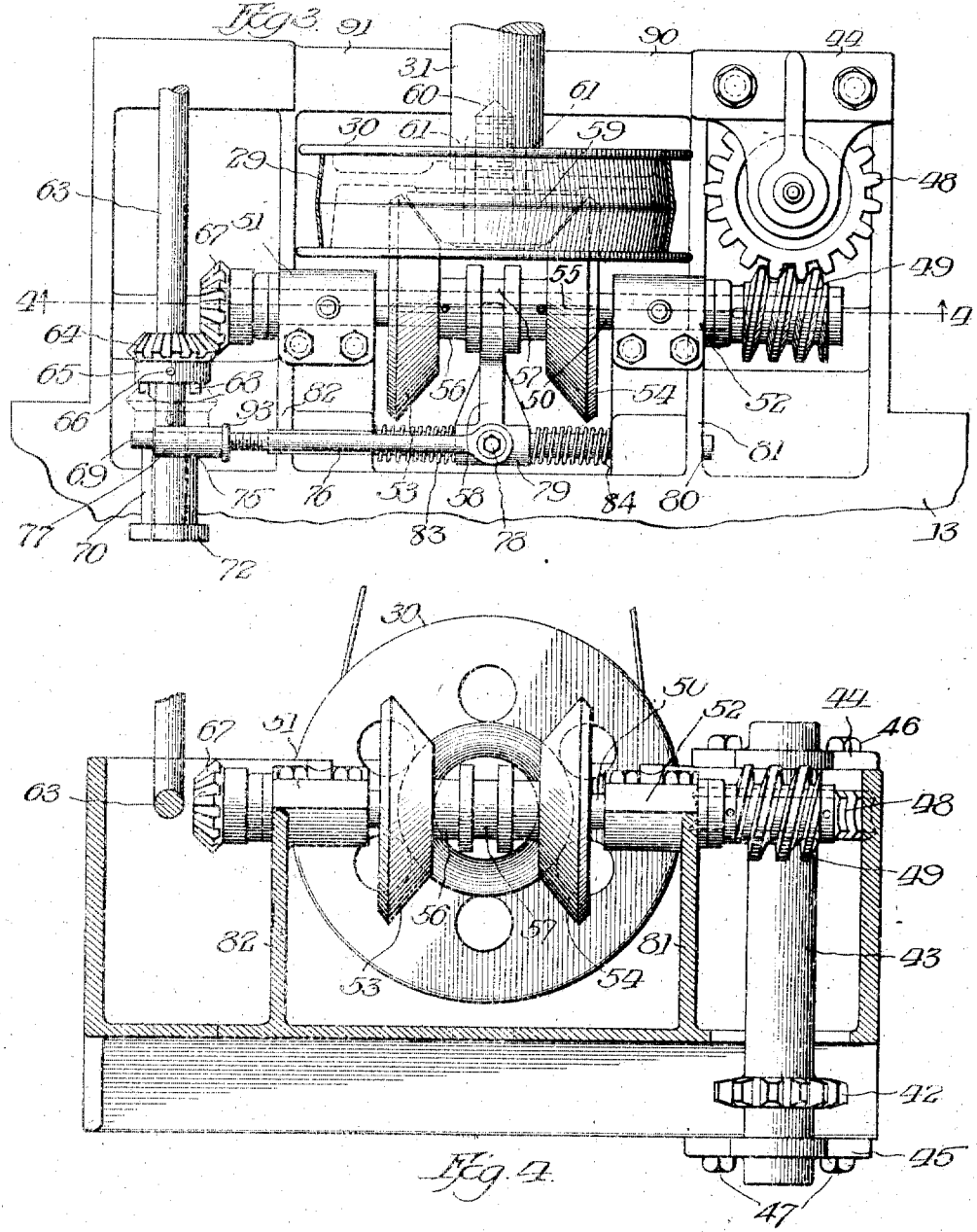

UNITED STATES PATENT OFFICE.

ROBERT O. HENDRICKSON, OF CLEVELAND, OHIO, ASSIGNOR TO WALLIS TRACTOR COMPANY, OF RACINE, WISCONSIN, A CORPORATION OF WISCONSIN.

STEERING MECHANISM FOR TRACTOR-ENGINES.

1,235,687.  Specification of Letters Patent.  Patented Aug. 7, 1917.

Application filed September 20, 1913. Serial No. 790,893.

*To all whom it may concern:*

Be it known that I, ROBERT O. HENDRICKSON, a citizen of the United States, residing at Cleveland, in the county of Cuyahoga and State of Ohio, have invented certain new and useful Improvements in Steering Mechanism for Tractor-Engines, of which the following is a specification.

In engines of this character, by reason of the necessary weight thereof and especially of the steering head and wheel it is desirable to provide means under the control of the operator for steering by power derived from the motor, but at the same time it is convenient to be able to steer directly by hand power in case of necessity as when for any reason the motor power steering mechanism is out of commission.

My invention has for its object to provide a simple and convenient apparatus for this purpose, and in the accompanying drawings I have disclosed a specific form of steering apparatus embodying my invention and in the following specification have fully described the same, but it is to be understood that the detailed disclosure is for the purpose of exemplification only, the scope of the invention being defined in the following claims in which I have endeavored to distinguish it from the prior art so far as known to me without, however, relinquishing or abandoning any portion thereof.

Referring now to the accompanying drawings, Figure 1 is a side elevation of so much of the forward end of a tractor as is necessary to understand my invention which is shown applied thereto, parts being shown as broken away to better disclose the construction; Fig. 2 is a side elevation on an enlarged scale of the working parts of the preferred form of my invention, so much of the frame and associated parts of the tractor being shown in section as is convenient for disclosing the mounting thereof; Fig. 3 is a plan view of the parts shown in Fig. 2; Fig. 4 a front elevation of the same, the frame of the tractor being shown in section on the line 4—4 of Fig. 3; Fig. 5 is an elevation, and Fig. 6 a section of a detail to be described below.

The same character of reference is applied to each part wherever it occurs throughout the several views.

Referring now more particularly to Fig. 1 the main frame of the tractor comprises a pair of side beams 11, one of which only is shown in the drawing, which are bolted at 12 to the sides of a rectangular projection 90 of a casting 13 which is circular in general plan, hollow, and has formed in the interior thereof a ball race 14 for a purpose to be presently described. Upon the framework is mounted the engine 15, which may be of any ordinary or improved type and is but fragmentarily shown in the drawing, and upon the circular casting is mounted a circular radiator 16 for cooling the water of the engine circulation, the pipes by which it is connected to the engine being shown at 17 and 18. The radiator is formed, as shown, of an annular series of pipes 19 connected between upper and lower headers 20—21 and within said radiator a fan 22 (see dotted lines, Fig. 1) revolves on a vertical axis in such a direction as to draw air in between the pipes of the radiator and discharge it upwardly. For this purpose the fan is mounted upon a spindle 23 mounted in suitable bearings, and provided with a pulley 28 for revolving the same. Said pulley is driven by a belt 29 from a pulley 30 mounted upon the end of the crank shaft 31 of the engine, said belt passing over an idler 31' intermediate said pulleys for a purpose which will be obvious from the drawings. The engine radiator fan and driving connections form no part of the invention which is the subject matter of the present application, but are described only for a better understanding of the latter. Within the circular casting 13 is mounted the steering head 32 which is provided with a ball race 33 in register with the ball race in said circular head, the balls 34 being arranged between the races in the usual manner. The steering head comprises, in addition to the annular portion forming the ball race, a pair of depending side brackets or forks 35 each having a vertical boxing 36 in which boxings is mounted the axle 37 of the front wheels 38, cushioning springs 39 being provided for the usual purpose of relieving shocks caused by irregularities over which the wheels may pass. The circular portion of the steering head casting is formed exteriorly with a channel 40 which receives an endless driving chain 41 which latter is secured at a suitable point therein and also embraces within its loop a sprocket 42 by which it is driven.

As shown more particularly in Figs. 3 and 4, the sprocket 42 is mounted upon a vertical shaft 43 which is journaled at its upper and lower ends respectively in bearings formed in brackets 44—45 bolted at 46—47 to the top and bottom edges respectively of the rear wall 91 of the rectangular extension 90 of the casting before described. Upon shaft 43 and near its upper end is pinned a worm wheel 48 which is engaged by a worm 49 keyed or pinned upon a horizontal shaft 50 which is mounted transversely of the machine in bearings 51—52. Intermediate said bearings a pair of bevel friction wheels 53—54 are splined at 55 (see Fig. 3) upon said shaft and rigidly connected together for common axial movement, the connecting sleeve 56 thereof being formed with a central groove 57 with which a shifting fork 58 is engaged. The beveled friction wheels 53—54 extend within the drum portion of the pulley 30 mentioned above as mounted upon the crank shaft of the engine, and are adapted to engage alternatively a beveled fiber friction wheel 59 which is secured to the end of the motor shaft 31 concentrically therewith by a bolt 60 tapped into a bore in the end of said shaft, rotative movement between the friction wheel and said shaft being prevented by pins 61—61 extending into said shaft and disk respectively at their opposite ends. It will now be seen that whenever the engine shaft is being driven the steering head may be turned in one direction or the other, as desired, by forcing the proper friction gear 53 or 54 into contact with the friction gear upon the engine shaft, power being transmitted from said gearing through shaft 50, worm 49, worm wheel 48, shaft 43, sprocket 42 and sprocket chain 41 to said steering head.

The pair of friction gears 53—54 are manually shifted axially from the hand wheel 62, when desired, to change the direction in which power is applied to the steering mechanism from the power shaft, a part of the connections from said hand wheel being also adapted, when it is desired to steer by hand power, to transmit motion directly to the transverse shaft 50. In order to carry out these functions the shaft 63 of the hand wheel is mounted in an inclined position passing through a bracket 98 on the framework of the tractor engine but it is capable of both an axial and a rotary movement in its bearings. The axial movement is for the purpose of throwing the shaft at will into engagement with either the transverse shaft or with the mechanism for shifting the pair of friction gears referred to above. Near its lower end the shaft is provided with a bevel gear 64 having a collar 65 which is pinned at 66 to said shaft and is arranged to engage a similar gear 67 keyed upon the end of the transverse shaft 50 when the hand wheel and its shaft are drawn rearwardly into the position shown in Figs. 2 and 3. From the forward or lower face of the collar 65 of gear wheel 64 a pair of studs or pins 68—68 projects which studs are adapted, when the hand wheel and its shaft are thrust forwardly and downwardly, to engage openings in a collar or flange 69 formed upon a sleeve 70 surrounding the shaft 63 within the bearing 71 formed in the casting 13 above described. The sleeve 70 is free to turn in said bearing but prevented from longitudinal movement therein by the flange 69 and a collar 72 which is pinned, as shown in Figs. 2 and 3, to the lower end of said sleeve. Flange 69 is extended at 73 into a wing or lug which is radially slotted with reference to the sleeve upon which the flange is mounted for the reception of a pin 74 upon a fork 75. The latter is adjustable upon a link 76, a nut or thimble 77 integral with said fork being threaded upon the link for the purpose of this adjustment and secured by locknut 93. The other end of the link is formed with an eye to receive a pin 78 upon the casting 79 which carries the shifting fork 58 by which the friction gears 53—54 are shifted, as above described. Casting 79 is pinned upon a shifting rod 80 which is mounted in bores or perforations formed in the webs 81—82 of the frame casting 13; and between said webs and the casting 79 are interposed springs 83—84 which tend to restore said casting when displaced to its central position in which, as will be seen from Fig. 3, the friction clutch gears are both out of contact with the friction gear upon the engine shaft.

From the above description it will be seen that when the hand wheel and its shaft are drawn rearwardly and upwardly the pinion 64 is carried into mesh with the pinion 67 upon the transverse shaft and the steering mechanism may be directly operated thereby. On the other hand when the hand wheel and its shaft are thrust forwardly and downwardly to bring the studs 68 into engagement with the opening formed in the collar 69, by rotating the hand wheel said collar and its sleeve may also be turned slightly to force at will one or the other of the friction gears 53, 54, into contact with the intermediate friction gear upon the engine shaft, motion being transmitted from said flange 69 to the pair of shiftable friction gears by means of the pin 74, fork 75, link 76, casting 79, and fork 58. When, however, the pressure upon the hand wheel is relieved the springs 83—84, or whichever one of them has been compressed, will restore the steering mechanism to the intermediate or inoperative position. Ordinarily the hand wheel and its shaft are in engagement with the mechanism for controlling the power drive but when it is desired to steer by hand power and the hand wheel has been drawn backward for this purpose, it may be maintained in this position by means of the dog 85 which is pivoted at 86 and formed with a head 87 which is adapted to be swung beneath the collar 88 upon the hand wheel, the head 87 being cut away at 89 and rabbeted at 90 to receive the shaft and collar respectively, see Figs. 2, 5, and 6.

I claim:

1. In a device of the class described, a continuously rotated driving shaft, a driven shaft, a steering head, driving connections from said driven shaft to said head for turning the latter, clutch mechanism intermediate the driving and driven shafts, means for effecting the engagement and disengagement of the clutch mechanism, a hand-operated shaft, gearing for effecting engagement of the last said shaft and the driven shaft, means for rendering said gearing effective and ineffective, and means for connecting the hand-operated shaft to the clutch for shifting the latter.

2. In a device of the class described, a continuously rotating shaft, a friction wheel upon the shaft, a driven shaft, a pair of friction wheels on the driven shaft adapted to be alternatively thrown into engagement with the first said friction wheel, a steering head, driving connections from the driven shaft to said head for turning the latter, means for throwing either of said pair of friction wheels on the driven shaft into engagement with the wheel upon the drive shaft, a hand-operated shaft, gearing for effecting the engagement of the hand-operated shaft and the driven shaft, means for rendering said gearing effective and ineffective, and means for connecting the hand-operated shaft to the pair of friction wheels for shifting the latter.

3. In a device of the class described, a motor driven drive shaft having a beveled gear thereon, a transverse driven shaft, a pair of bevel gears on said driven shaft and movable axially thereon to alternatively engage the gear on the driving shaft, a steering head, driving connections from the driven shaft to said head for turning the latter, means for axially shifting the gear wheels on the driven shaft, a hand-operated shaft, gearing for effecting driving engagement between said hand-operated shaft and the driven shaft, and connections whereby the pair of gears on the driven shaft may be shifted from the hand-operated shaft.

4. In a device of the class described, a continuously rotating driving shaft, a driven shaft, a steering head and connections between the same and the driven shaft, a clutch for effecting engagement of the driven shaft with the driving shaft, a gear on the driven shaft, a hand-operated shaft, a gear on the hand-operated shaft engaging the gear on the driven shaft, means adapted to be engaged by the hand-operated shaft for shifting the clutch upon the driven shaft.

5. In a device of the class described, a driving shaft, a driven shaft, a steering head and connections for driving said steering head from the driven shaft, a clutch for driving the driven shaft from the driving shaft, means for shifting the clutch, a rotary and axially shiftable hand-operated shaft, means for driving the driven shaft from said hand-operated shaft, and means for shifting the clutch from said hand-operated shaft, the latter being movable axially to effect engagement for directly driving the driven shaft and shifting the clutch.

6. In a device of the class described, a continuously operating driving shaft, a driven shaft, a steering head and connections from the driven shaft to the steering head, a clutch for effecting engagement between the driving and driven shafts, clutch shifting mechanism, a hand-operated shaft adapted for rotary and longitudinal movement, and means thrown into and out of engagement by the longitudinal movement of the hand-operated shaft for directly operating the driven shaft from the latter and for shifting the clutch from the hand-operated shaft.

7. In a device of the class described, a motor driven driving shaft, a gear upon the end thereof, a driven shaft arranged transversely of the axis of the driving shaft and having a pair of gears adapted to be thrown alternatively into engagement with the gear upon the driving shaft, a worm upon the driven shaft, a vertical shaft carrying a worm wheel engaging said worm and a sprocket, a steering head, a sprocket chain embracing said sprocket and steering head, means for shifting said pair of gears longitudinally of the driven shaft to bring either of them at will into engagement with the gear upon the driving shaft, a gear secured to the driven shaft, a hand-operated shaft adapted to have rotary and axial movement, a gear mounted on the last said shaft and adapted to engage the gear upon the driven shaft for shifting the pair of gears upon the driven shaft, a rotary member adapted to be engaged with the hand-operated shaft, and connections between said rotary member and the clutch shifting mechanism.

ROBERT O. HENDRICKSON.

Witnesses:
W. C. WINKEL,
B. V. CRANDALL.